United States Patent
Yu et al.

(10) Patent No.: US 9,680,550 B2
(45) Date of Patent: Jun. 13, 2017

(54) METHOD AND APPARATUS FOR TRANSMITTING FEEDBACK ABOUT CHANNEL HAVING SPATIAL CORRELATION

(71) Applicants: Samsung Electronics Co., Ltd., Gyeonggi-do (KR); Industry-Academic Cooperation Foundation, Yonsei University, Seoul (KR)

(72) Inventors: Hyoung-Youl Yu, Seoul (KR); Chungyong Lee, Seoul (KR); Ilgyu Choi, Seoul (KR); Young-Woo Kwak, Gyeonggi-do (KR); Hyo-Jin Lee, Gyeonggi-so (KR); Hyoung-Ju Ji, Seoul (KR); Youn-Sun Kim, Gyeonggi-do (KR)

(73) Assignees: SAMSUNG ELECTRONICS CO., LTD, Suwon-si, Gyeonggi-Do (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 39 days.

(21) Appl. No.: 14/639,830

(22) Filed: Mar. 5, 2015

(65) Prior Publication Data

US 2015/0256239 A1 Sep. 10, 2015

(30) Foreign Application Priority Data

Mar. 5, 2014 (KR) .................. 10-2014-0026178

(51) Int. Cl.
*H04B 7/04* (2017.01)
*H04B 7/06* (2006.01)
(Continued)

(52) U.S. Cl.
CPC ......... *H04B 7/0632* (2013.01); *H04B 7/0456* (2013.01); *H04W 28/06* (2013.01); *H04W 72/02* (2013.01)

(58) Field of Classification Search
None
See application file for complete search history.

(56) References Cited

U.S. PATENT DOCUMENTS 8,509,338 B2 8/2013 Sayana et al.
8,576,937 B2 11/2013 Han et al.
(Continued)

FOREIGN PATENT DOCUMENTS

KR 20080087369 A 10/2008

OTHER PUBLICATIONS

International Search Report dated May 27, 2015 in connection with International Patent Application No. PCT/KR2015/002131; 3 pages.

(Continued)

*Primary Examiner* — Hassan Kizou
*Assistant Examiner* — Hashim Bhatti

(57) ABSTRACT

A method for a data signal on channels having spatial correlations by a Base Station (BS) is provided. The method includes estimating the spatial correlations of the channels, selecting a part of the channels based on a result of the estimation and transmitting a signal for channel estimation on the selected partial channels, and receiving channel estimation information estimated based on the signal from a User Equipment (UE) and generating a data signal to be transmitted to the UE on the channels using the channel estimation information.

18 Claims, 6 Drawing Sheets

(51) Int. Cl.
*H04B 7/0456* (2017.01)
*H04W 28/06* (2009.01)
*H04W 72/02* (2009.01)

(56) References Cited

U.S. PATENT DOCUMENTS

| | | | |
|---|---|---|---|
| 8,588,799 B2 | 11/2013 | Lv et al. | |
| 9,042,474 B2 | 5/2015 | Chen et al. | |
| 2005/0031062 A1* | 2/2005 | Shim | H04B 7/0417 375/347 |
| 2005/0032521 A1* | 2/2005 | Lee | H04B 7/0417 455/450 |
| 2006/0140297 A1* | 6/2006 | Maltsey | H04B 7/0857 375/260 |
| 2007/0099584 A1* | 5/2007 | Niu | H04B 7/04 455/101 |
| 2008/0240274 A1 | 10/2008 | Han et al. | |
| 2011/0274188 A1 | 11/2011 | Sayana et al. | |
| 2012/0214500 A1 | 8/2012 | Lv et al. | |
| 2012/0263245 A1* | 10/2012 | Carbonelli | H04L 25/0232 375/260 |
| 2013/0028344 A1* | 1/2013 | Chen | H04B 7/0417 375/267 |
| 2013/0230007 A1 | 9/2013 | Nagata et al. | |
| 2013/0272439 A1* | 10/2013 | Zhang | H04B 7/0456 375/267 |

OTHER PUBLICATIONS

Written Opinion of International Searching Authority dated May 27, 2015 in connection with International Patent Application No. PCT/KR2015/002131; 5 pages.

Jafar, et al.; "Channel Capacity and Beamforming for Multiple Transmit and Receive Antennas with Covariance Feedback"; IEEE-Helsinki; Jun. 11-14, 2001; vol. 7; 7 pages.

Thomas L. Marzetta, "Noncooperative Cellular Wireless with Unlimited Numbers of Base Station Antennas," IEEE Transactions Wireless Communications, Nov. 2010, vol. 9, No. 11, 11 pages.

Hien Q. Ngo, et al., "Energy and Spectral Efficiency of Very Large Multiuser MIMO Systems," IEEE Transactions Communications, vol. 61, No. 4, Apr. 2013, 14 pages.

Jakob Hoydis, et al., "Massive MIMO: How many antennas do we need?," 49th Annual Allerton Conference on Communication, Control, and Computing, Allerton House, Illinois, Sep. 28-30, 2011, 6 pages.

Jubin Jose, et al., "Pilot Contamination and Precoding in Multi-Cell TDD Systems," IEEE Transactions on Wireless Communications, vol. 10, No. 8, Aug. 2011, 12 pages.

N. Jindal, "MIMO broadcast channels with finite-rate feedback," IEEE Trans. Inf. Theory, Nov. 2006, vol. 52, No. 11, 16 pages.

Bertrand M. Hochwald, et al., "Systematic Design of Unitary Space-Time Constellations", IEEE Transactions on Information Theory, Sep. 1998, rev. Oct. 1999 and Mar. 2000, vol. 46, No. 6, 28 pages.

\* cited by examiner

METHOD AND APPARATUS FOR TRANSMITTING FEEDBACK ABOUT CHANNEL HAVING SPATIAL CORRELATION

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 5, 2014 and assigned Serial No. 10-2014-0026178, the entire disclosure of which is incorporated herein by reference.

TECHNICAL FIELD

The present disclosure relates to a pre-$5^{th}$-Generation (5G) communication system to be provided for supporting higher data rates Beyond $4^{th}$-Generation (4G) communications system such as Long Term Evolution (LTE), specifically to a method and apparatus for transmitting a feedback about a channel having a spatial correlation.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), sparse code multiple access (SCMA), and Low-Density Parity-Check (LDPC) coding as an advanced access technology have been developed.

A Massive Multiple Input Multiple Output (MIMO) system is advantageous in that factors degrading system performance, such as fast fading, inter-user interference, and inter-cell interference, can be eliminated by use of a simple linear precoder by installing tens of or hundreds of antennas at a Base Station (BS). To achieve the advantages of the massive MIMO system, the premise that the BS has knowledge of accurate channel information should be satisfied. Accordingly, a legacy massive MIMO scheme is performed in Time Division Duplexing (TDD) mode in which channel estimation cost is not affected by the number of antennas. However, the TDD mode has low frequency efficiency, relative to Frequency Division Duplexing (FDD) mode. That's why most of current commercialized communication systems support the FDD mode. Accordingly, there is a need for a technique for implementing massive MIMO in the FDD mode in consideration of compatibility with many current commercialized communication systems.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide at least the advantages described below. Accordingly, an aspect of the present disclosure is to provide a method and apparatus for estimating total large-capacity channels using a part of the channels.

In accordance with an aspect of the present disclosure, there is provided a method for a data signal on channels having spatial correlations by a Base Station (BS). The method includes estimating the spatial correlations of the channels, selecting a part of the channels based on a result of the estimation and transmitting a signal for channel estimation on the selected partial channels, and receiving channel estimation information estimated based on the signal from a User Equipment (UE) and generating a data signal to be transmitted to the UE on the channels using the channel estimation information.

In accordance with another aspect of the present disclosure, there is provided a method for transmitting a feedback about channels having spatial correlations. The method includes receiving a signal for channel estimation on partial channels selected based on estimates of the spatial correlations, estimating the partial channels based on the received signal, and feeding back channel estimation information about the channels estimated based on estimates of the partial channels to a Base Station (BS).

In accordance with another aspect of the present disclosure, there is provided an apparatus for transmitting and receiving a data signal on channels having spatial correlations. The apparatus includes a controller configured to estimate the spatial correlations of the channels, select a part of the channels based on a result of the estimation, control a transceiver to transmit a signal for channel estimation on the selected partial channels, receive channel estimation information estimated based on the signal from a UE, and control the transceiver to transmit a data signal to the UE on the channels using the channel estimation information.

In accordance with another aspect of the present disclosure, there is provided an apparatus for transmitting a feedback about channels having spatial correlations. The apparatus includes a transceiver configured to receive a signal for channel estimation on partial channels selected based on estimates of the spatial correlations, and a controller configured to estimate the partial channels based on the received signal and control the transceiver to feedback channel estimation information about the channels estimated based on estimates of the partial channels to a BS.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
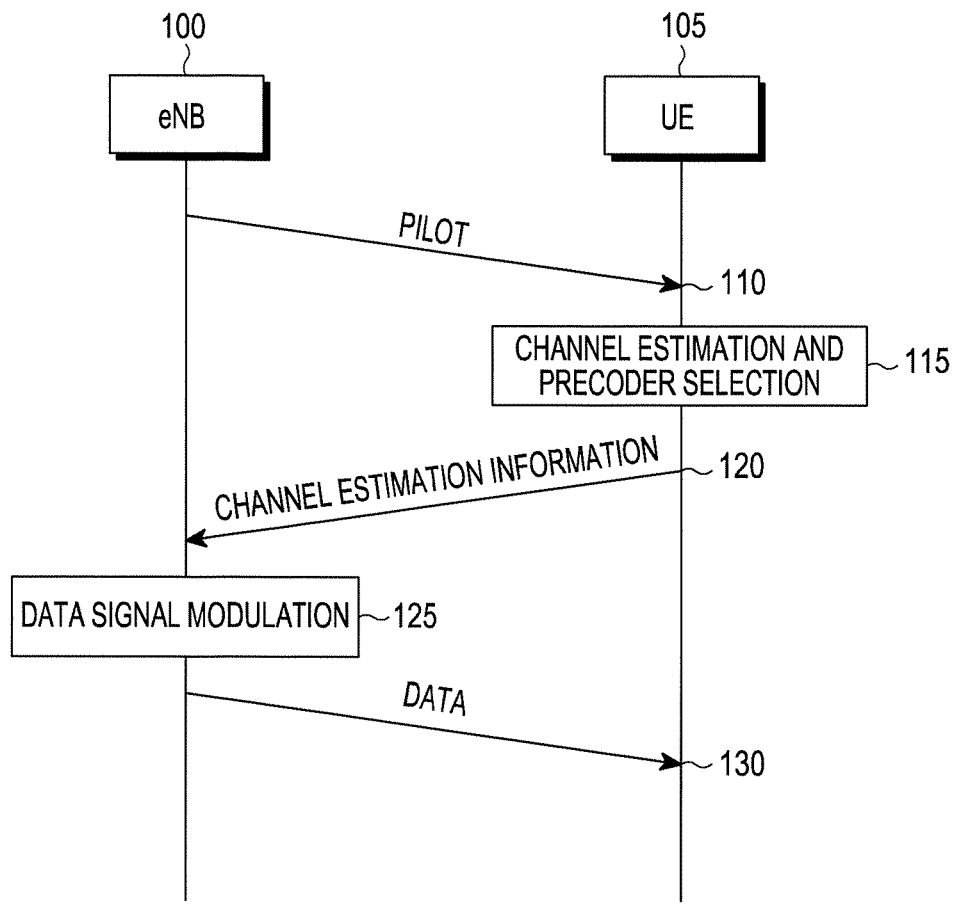
FIG. 1 is an exemplary diagram illustrating a signal flow for a channel feedback operation in a general Multiple Input Multiple Output (MIMO) system operating in Frequency Division Duplexing (FDD) mode.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device or wireless communications system. Reference will be made to preferred embodiments of the present disclosure with reference to the attached drawings. Like reference numerals denote the same components, although they are shown in different drawings. A detailed description of a generally known function and structure of the present disclosure will be avoided lest it should obscure the subject matter of the present disclosure. In addition, although the terms used in the present disclosure are defined in consideration of functions of the present disclosure, the terms may be changed according to the intention of a user or an operator, or customs. Therefore, the present disclosure must be understood, not simply by the actual terms used but by the meanings of each term lying within.

FIG. 1 is an exemplary diagram illustrating a signal flow for a channel feedback operation in a general Multiple Input Multiple Output (MIMO) system operating in Frequency Division Duplexing (FDD) mode. A Base Station (BS) corresponds to an evolved Node B (eNB) or a Node B operating in a Long Term Evolution (LTE) system in the present disclosure. Also, a terminal corresponds to a User Equipment (UE) manipulated by a user.

Referring to FIG. 1, an eNB 100 transmits a downlink pilot to a UE 105 through each antenna that the eNB 100 has in operation 110. For the convenience of description, FIG. 1 will be described in the context of a single-cell, single-user, and single-stream environment, by way of example. However, it is to be clearly understood that the operation illustrated in FIG. 1 can be extended to a multi-cell, multi-user, and multi-stream environment. For example, if the eNB 100 has M antennas in total and the UE 105 has one antenna, a time taken for the eNB 100 to transmit downlink pilots is proportional to the total number of antennas, M. It is assumed that channels between the eNB 100 and the UE 105 are spatially correlated. In operation 115, the UE 105 estimates channels h between the UE 105 and the eNB 100 based on the received downlink pilots and selects a precoder that maximizes reception performance from a prestored codebook. The channels can be expressed as an M×1 vector h according to equation (1).

$$h = R^{1/2} h_w \qquad (1)$$

where $h_w$ represents a Rayleigh fading channel and R represents a spatial correlation matrix given by $R = E\{h^H h\}$.

The UE 105 transmits channel estimation information to the eNB 100 in operation 120. The channel estimation information can include, for example, an estimated Channel Quality Indicator (CQI) and a Precoder Matrix Indicator (PMI) indicating the selected precoder. The CQI can be an indicator representing the reception performance of the UE 105, determined by the following equation.

$$CQI = \frac{|h^H f|^2 E_s}{N_0} \qquad (2)$$

where $E_s$ represents power of the UE 105 that a user uses in transmitting data through the selected precoder and $N_0$ represents a variance of white Gaussian noise generated when the eNB 100 receives the data.

If the codebook is a code book including $2^B$ precoders, ($W = \{w_1, \ldots, w_{2^B}\}$), a precoder f that maximizes the CQI can be selected according to equation (3). The PMI can be represented in B bits.

$$f = \underset{w \in W}{\operatorname{argmax}} |h^H w|^2 \qquad (3)$$

where w represents any of the precoders included in the codebook.

In operation 125, the eNB 100 selects a Modulation and Coding Scheme (MCS) level mapped to the received CQI in a stored MCS table. The eNB 100 modulates data to be transmitted to the UE 105 using a modulation order and code rate corresponding to the MCS level and loads the modulated data on a precoder corresponding to the received PMI. In operation 130, the eNB transmits the modulated data to the UE 105.

The above channel feedback operation requires resources proportional to the total number M of antennas at the eNB 100. The resources mean the volume of computation performed at the UE 105 and power and time taken for the computation. Specifically, to detect a codebook, the UE 105 should perform vector multiplication $|h^H w|^2 2^B$ times. As a consequence, resources proportional to $M \times 2^B$ are required. Further, resources proportional to B are needed for an operation for feeding back the channel estimation information. It is noted that the number of feedback bits and the number of antennas should be proportional through an effective channel gain approximated by the following equation in the channel feedback operation.

$$|h^H f|^2 \approx \|h\|^2 \left(1 - 2^{\frac{-B}{M-1}}\right) \tag{4}$$

Accordingly, if the above channel feedback operation is performed in a massive MIMO system using a large number of antennas, most of resources are consumed during channel estimation and precoder selection and thus there is substantially a lack of resources for data communication. Even though sufficient resources are available, the size of a codebook supporting massive MIMO is huge. It is difficult to generate this codebook and a large memory is needed to store the codebook.

In this context, an embodiment of the present disclosure provides a method for selecting a part of total channels and estimating the total channels using the selected channels in a massive MIMO system.

Figure 2:
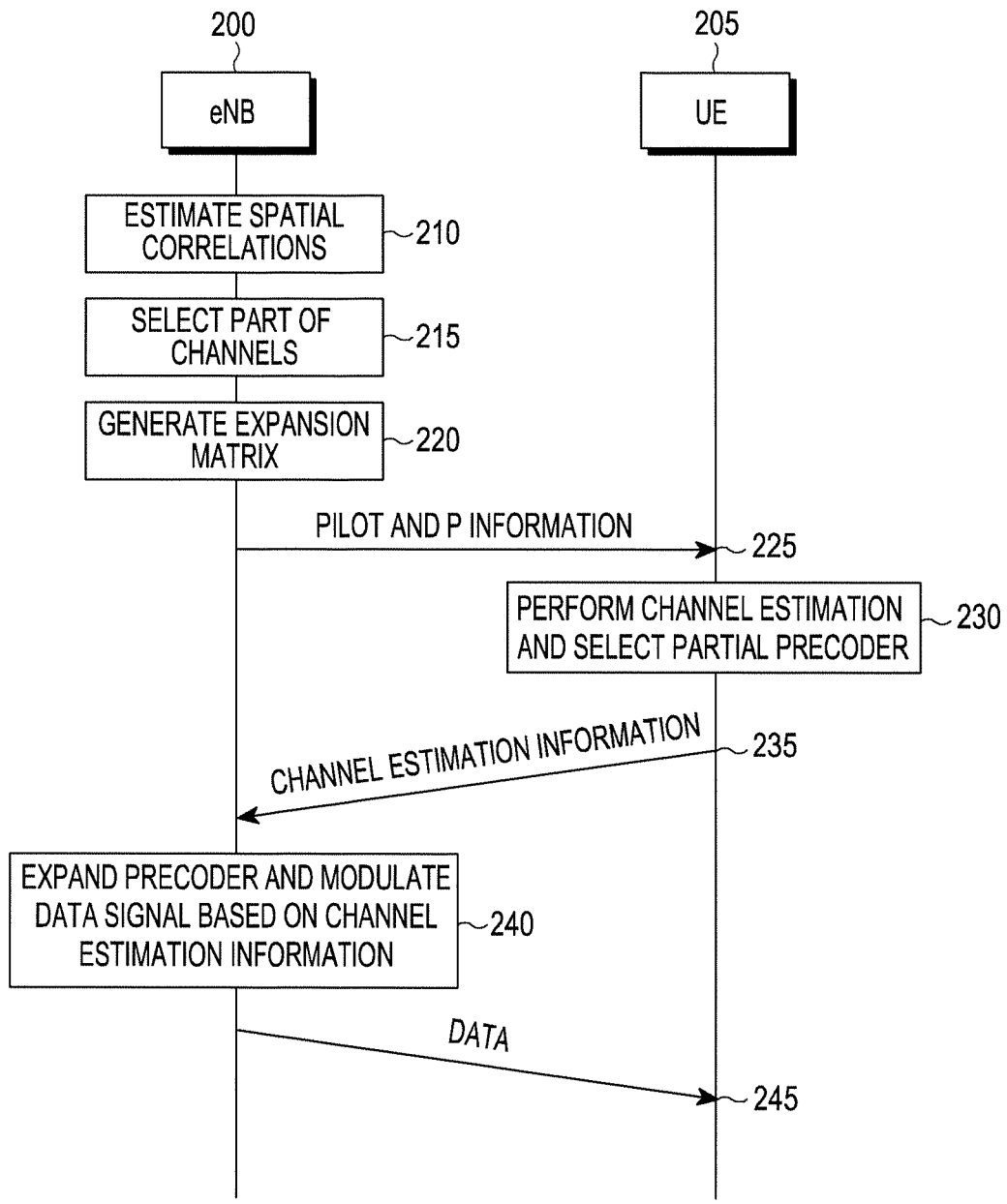
FIG. 2 is an exemplary diagram illustrating a signal flow for a channel feedback operation in a massive MIMO system according to an embodiment of the present disclosure.

FIG. 2 is an exemplary diagram illustrating a signal flow for a channel feedback operation in a massive MIMO system according to an embodiment of the present disclosure. For the convenience of description, FIG. 2 will also be described in the context of a single-stream environment assumed in FIG. 1. However, the present disclosure is also applicable to a multi-stream environment.

Referring to FIG. 2, an eNB 200 measures spatial correlations using uplink pilots received from a UE 205 in operation 210. Since it is generally known that spatial correlations are very similar on an uplink and a downlink, uplink spatial correlations can be used for a downlink environment in the present disclosure. Or according to another embodiment, the eNB 200 uses a feedback of spatial correlations estimated by the UE 205.

In operation 215, the eNB 200 selects a part of total channels based on the spatial correlations estimated by the eNB 200 or acquired from the UE 205. The eNB 200 selects the channels in correspondence with a default selection matrix S or different channels at each time in consideration of a current channel state to maximize an effective channel gain. For example, if current spatial correlations between antennas are relatively high, the eNB 200 uses a selection matrix S including only antennas positioned at each edge of an entire antenna configuration. The eNB 200 reduces resources required for channel estimation by selecting a part L of M total antennas.

The eNB 200 acquires an expansion matrix according to an embodiment of the present disclosure in operation 220. The expansion matrix is calculated using equation (7) and equation (8). The afore-described operations 210 to 220 are affected by the spatial correlations of the channels. The spatial correlations change very slowly, compared to estimated channels h. Thus, there is no need for estimating spatial correlations before each channel estimation. Accordingly, if the channels h have been changed but the spatial correlations have not been changed, a previous selection matrix S and expansion matrix can still be used.

The total channels h can be expressed separately into partial channels $h_s$ about which the UE 205 transmits a feedback and the remaining partial channels $h_e$ as follows.

$$h = S^H h_s + E^H h_e \tag{5}$$

where E is defined as an $(M-L) \times M$ error matrix which is used to represent the remaining $(M-L)$ channels $h_e$ not selected for the selection matrix S as $h_s = Eh$. In an embodiment of the present disclosure, the eNB 200 estimates the channels $h_e$ about which the UE 205 does not transmit a feedback to the eNB 200 using the feedback about the partial channels $h_s$. Because spatial correlations exist in the channels between the eNB 200 and the UE 205, the remaining partial channels $h_e$ include a part that can be calculated using $h_s$ and a part independent of $h_s$. Then, $h_e$ can be determined by equation (6) based on these parts.

$$h_e = A h_s + b \tag{6}$$

where A represents a ratio of the partial channels $h_s$ included in the channels $h_e$ and b represents a part independent of the channels $h_s$.

Based on the independency between $h_s$ and B, the matrix A and the vector b can be calculated by equation (7).

$$h_e = A h_s + b \tag{7}$$
$$E\{h_e h_s^H\} = ERS^H = ASRS^H \Rightarrow A = ERS^H (SRS^H)^{-1}$$
$$b = (E - AS)h$$

Subsequently, substitution of equation (6) into equation (5) results in equation (8).

$$h = S^H h_s + E^H (A h_s + b) \tag{8}$$
$$= (S^H + E^H A) h_s + E^H b$$
$$= P h_s + e$$

where P represents an expansion matrix, e is an expansion error, and the expansion matrix and the expansion error are expressed as $P = S^H + E^H A$ and $e = E^H b$, respectively.

As a consequence, the eNB 200 transmits information about the expansion matrix P acquired by equation (8) on a control channel in operation 225.

The eNB 200 transmits downlink pilots on the selected channels to the UE 205.

In operation 230, the UE 205 estimates the selected channels based on the received downlink pilots and selects a precoder (hereinafter, referred to as a partial precoder) based on the estimated channel information and the expansion matrix.

Figure 3A:
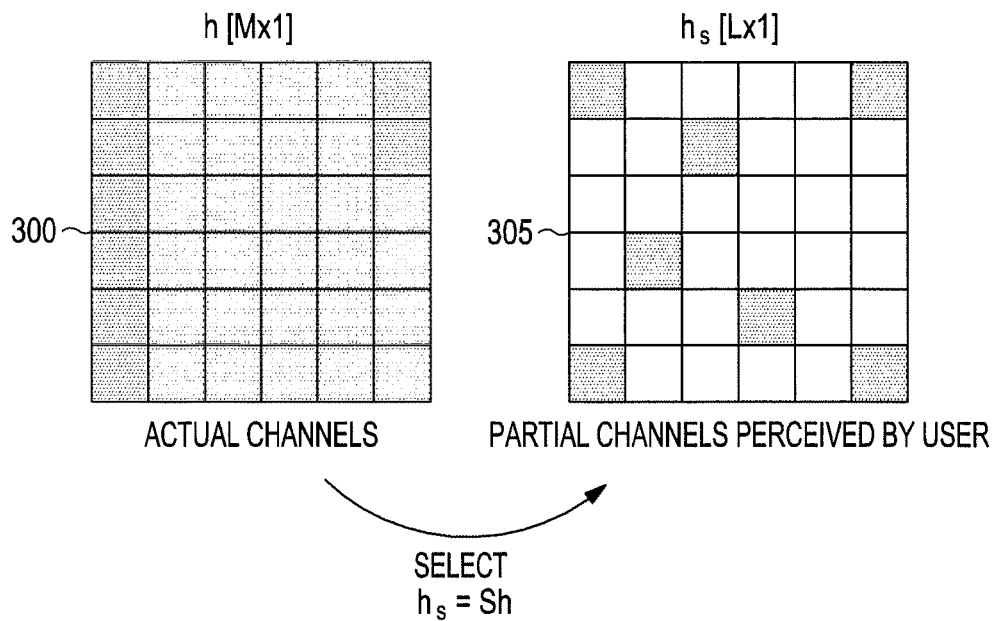
FIG. 3A illustrates exemplary selected channels according to an embodiment of the present disclosure.

FIG. 3A illustrates exemplary selected channels according to an embodiment of the present disclosure.

In the illustrated case of FIG. 3A, when the eNB 200 selects L antennas (L<M), L channels (L<M) $h_s$ 305 (hereinafter, referred to as partial channels) are shown as selected from among total M×1 channels h 300. Shaded blocks of the total channels h 300 represent the M×1 channels and shaded partial blocks of the partial channels $h_s$ 305 represent the L×1 (L<M) channels.

Consequently, the UE 205 estimates the partial channels $h_s$ 305 instead of the total channels h 300 according to an embodiment of the present disclosure. The partial channels $h_s$ 305 can be calculated by multiplying the total channels h 300 by an L×M selection matrix S. For example, if M is 4 and two channels (L=2) are selected, the total channels h, the selection matrix S, and the partial channels $h_s$ are expressed as equation (9).

$$h = \begin{bmatrix} h_1 \\ h_2 \\ h_3 \\ h_4 \end{bmatrix}, s = \begin{bmatrix} 1 & 0 & 0 & 0 \\ 0 & 0 & 1 & 0 \end{bmatrix}, h_s = \begin{bmatrix} h_1 \\ h_2 \end{bmatrix} \quad (9)$$

Subsequently, the UE 205 estimates a CQI for the case where the eNB 200 uses an expansion precoder for the total channels, using the partial channels $h_s$ and the received expansion matrix. The UE 205 then selects an L×1 f (hereinafter, referred to as a partial precoder) that maximizes the estimated CQI from a prestored codebook precoder $W=\{w_1, \ldots, w_{2^B}\}$. The expansion precoder will be described in detail later.

Since the partial channels $h_s$ have a smaller dimension that the total channels h, a codebook can be formed by Random Vector Quantization (RVQ) or Discrete Fourier Transform (DFT) according to a distribution of the partial channels $h_s$ as used in a legacy MIMO system. To calculate the CQI estimated for the case where the eNB uses an expansion precoder for the total channels, equation (14) is derived from equation (12) and equation (13). Specifically, the relationship between the partial precoder f selected using the partial channels $h_s$ and an expansion precoder $f_p$ for the total channels h can be given as equation (10) based on equation (8) describing the relationship between the partial channels $h_s$ and the total channels h. In equation (10), normalization is performed to set the norm of the partial precoder f to 1, with an expansion error part unperceivable to the UE 205 excluded.

$$f_p = Pf/\sqrt{f^H P^H P f} \quad (10)$$

If the expansion precoder $f_p$ is used, a total effective channel gain is given as equation (11).

$$|h^H f_p|^2 = \frac{|(Ph_s + e)^H Pf|^2}{f^H P^H Pf} \quad (11)$$

Since the expansion error e is unperceivable to the UE 205, the total effective channel gain is averaged by equation (12).

$$E\{|h^H f_p|^2\} = \frac{f^H P^H P h_s h_s^H P^H Pf + f^H P^H R_e Pf}{f^H P^H Pf} \quad (12)$$

where $R_e$ represents an expansion error covariance matrix expressed as $E^H(E-AS)R(E^H-S^H A^H)E$. The numerator of equation (12) includes a part related to the partial channels $h_s$, $f^H P^H P h_s h_s^H P^H Pf$ and an expansion error covariance matrix part $f^H P^H R_e Pf$. The expansion error covariance matrix can be represented as a three-dimensional oval by geometric analysis. In this case, the center of the three-dimensional oval is $h_s$. Therefore, the expansion error covariance matrix very slightly affects selection of the partial precoder f. Thus, equation (12) can be approximated to equation (13).

$$E\{|h^H f_p|^2\} \approx \frac{f^H P^H P h_s h_s^H P^H Pf}{f^H P^H Pf} \quad (13)$$

If the average channel gain is approximated as in equation (13), the CQI for the case where the eNB 200 uses an expansion precoder for the total channels is calculated by the following equation.

$$CQI = \left(\frac{f^H P^H P h_s h_s^H P^H Pf}{f^H P^H Pf}\right)\frac{E_s}{N_0} \quad (14)$$

Then the UE 205 selects the partial precoder f that maximizes the CQI by equation (15).

$$f \approx \operatorname*{argmax}_{w \in W} \frac{w^H P^H P h_s h_s^H P^H Pw}{w^H P^H Pw} \quad (15)$$

In operation 235, the UE 205 feeds back channel estimation information including a PMI corresponding to the partial precoder and the CQI estimated for the case where the eNB 200 uses the expansion precoder for the total channels to the eNB 200. The eNB 200 expands the partial precoder f to a precoder for the total channels based on the channel estimation information by equation (10) in operation 240.

Figure 3B:
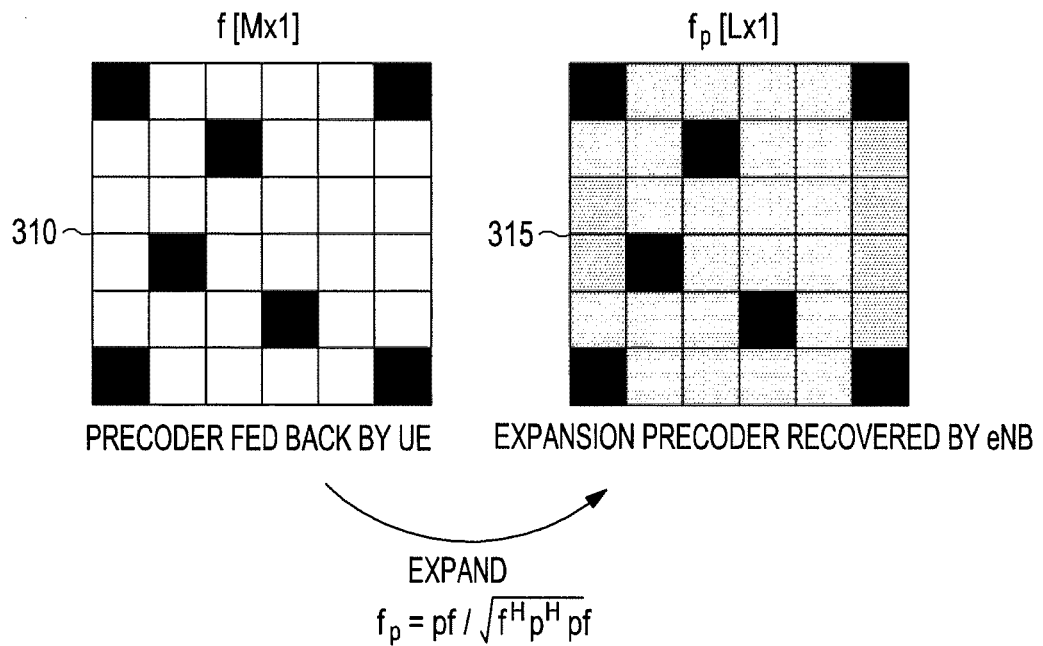
FIG. 3B illustrates exemplary precoder expansion for total channels based on a partial precoder fed back by a User Equipment (UE) according to an embodiment of the present disclosure.

FIG. 3B illustrates exemplary precoder expansion for total channels based on a partial precoder fed back by a UE according to an embodiment of the present disclosure.

Referring to FIG. 3B, the partial precoder f is a precoder 310 which is selected using channels on which the eNB 200 transmits pilot signals, for example, the partial channels $h_s$ 305 of FIG. 3A and an expansion matrix, as described before. The partial precoder 310 is denoted by shaded partial blocks among total channels. The eNB 200 recovers, for example, an expansion precoder $f_p$ 315 for the total channels h 300 of FIG. 3A based on the partial precoder f. The expansion precoder $f_p$ 315 covers the remaining blocks as well as the partial blocks corresponding to the partial channels $h_s$ 305. The eNB 200 acquires a gain for the channels about which a feedback has not been received from the UE 205 based on spatial correlations between channels as well as simply increases a precoder size by the recovery operation of the eNB 200. Specifically, the expansion precoder $f_p$ is acquired by multiplying the selected precoder f by an M×L expansion matrix P and performing normalization to set the norm of the selected precoder f to 1 by equation (10). The expansion precoder $f_p$ is expressed without an expansion error part unperceivable to the UE 205.

Subsequently, the eNB 200 determines a modulation order and code rate matching the feedback CQI received from the UE. The eNB 200 modulates a data signal to be transmitted to the UE 205 using the determined modulation order and code rate and loads the modulated signal on the expansion precoder. In operation 245, the eNB transmits the modulated data signal to the UE 205.

Figure 4:
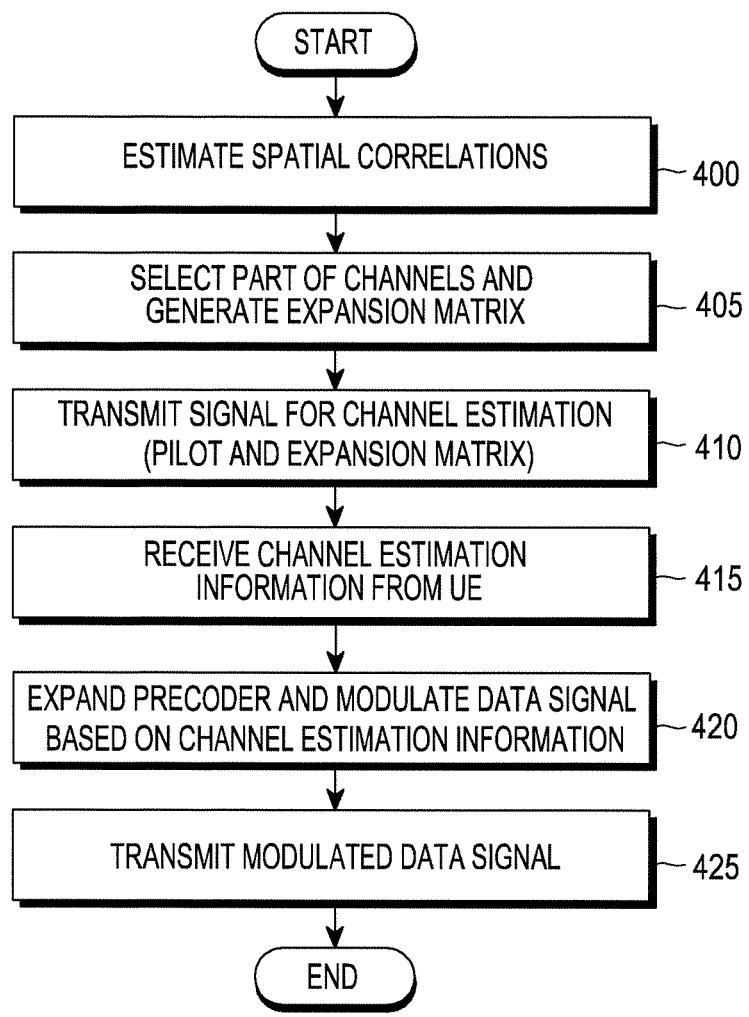
FIG. 4 is a flowchart illustrating an operation of an evolved Node B (eNB) according to an embodiment of the present disclosure.

FIG. 4 is a flowchart illustrating an operation of an eNB according to an embodiment of the present disclosure.

Referring to FIG. 4, the eNB estimates spatial correlations of total channels between the eNB and a UE using uplink pilot signals in operation 400. Or according to another embodiment, the UE transmits information about estimated spatial correlations of the total channels to the eNB. In operation 405, the eNB selects a part of the total channels based on the channel estimation. As described before, the eNB uses a default selection matrix or a selection matrix including antennas that are selected differently each time, in consideration of a current channel state, when selecting the partial channels. The eNB acquires an expansion matrix using equation (7) and equation (8). As in FIG. 2, there is no need for performing operations 400 and 405 each time channels are estimated. If the channels h have been changed but the spatial correlations have not been changed, a previous selection matrix and expansion matrix can still be used. In operation 410, the eNB transmits downlink pilot signals on the selected partial channels and transmits information about the expansion matrix on a control channel.

In operation 415, the eNB receives channel estimation information estimated based on the signal for channel estimation from the UE. The channel estimation information includes a UE-estimated CQI for the case where an expansion precoder is used and a partial precoder selected based on the CQI.

Upon receipt of the channel estimation information, the eNB acquires an expansion precoder for the total channels using the partial precoder acquired from the channel estimation information by equation (10) in operation 420. Then the eNB modulates a data signal to be transmitted to the UE using a modulation order and code rate matching the CQI acquired from the channel estimation information and loads the modulated data signal on the expansion precoder. In operation 425, the eNB transmits the modulated data signal on the total channels to the UE.

Figure 5:
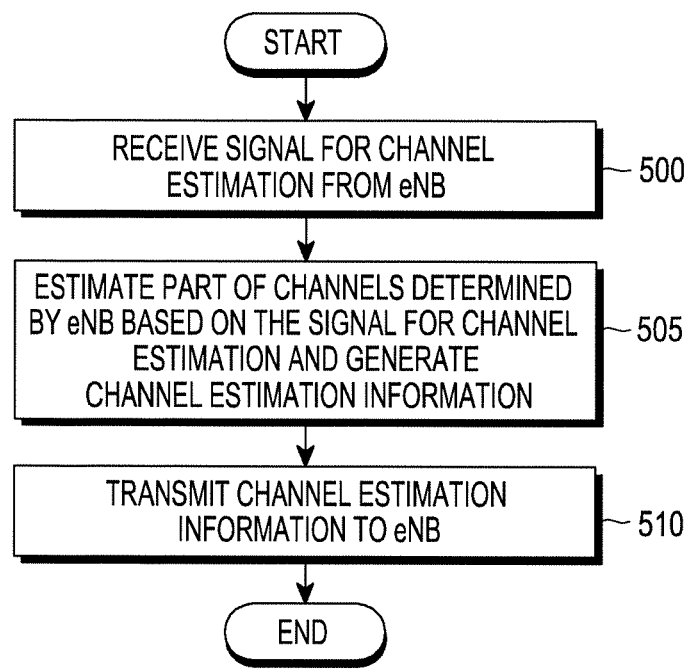
FIG. 5 is a flowchart illustrating an operation of a UE according to an embodiment of the present disclosure.

FIG. 5 is a flowchart illustrating an operation of a UE according to an embodiment of the present disclosure. According to some embodiments, the UE estimates spatial correlations of channels between an eNB and the UE and transmit the estimation result to the eNB.

Referring to FIG. 5, the UE receives a signal for channel estimation on partial channels selected by the eNB in operation 500. The signal for channel estimation includes a pilot signal transmitted by the eNB and information about an expansion matrix. The expansion matrix is calculated according to equation (7) and equation (8) by the eNB. If the channels h have been changed but the spatial correlations have not been changed, previous values can still be used. Upon receipt of the signal for channel estimation, the UE estimates the partial channels selected by the eNB based on the signal for channel estimation and estimates a CQI for the case where the eNB uses an expansion precoder for the total channels, based on the channel estimation result and the received expansion matrix in operation 505. The UE selects a partial precoder that maximizes the estimated CQI. The partial channels can be selected using a default selection matrix or using a selection matrix that includes different antennas at each time in consideration of a current channel state by the eNB. In operation 510, the UE transmits channel estimation information generated based on the estimation result to the eNB. The channel estimation information includes the estimated CQI for the case where the eNB uses an expansion precoder for the total channels and a PMI indicating the partial precoder that maximizes the estimated CQI.

Figure 6:
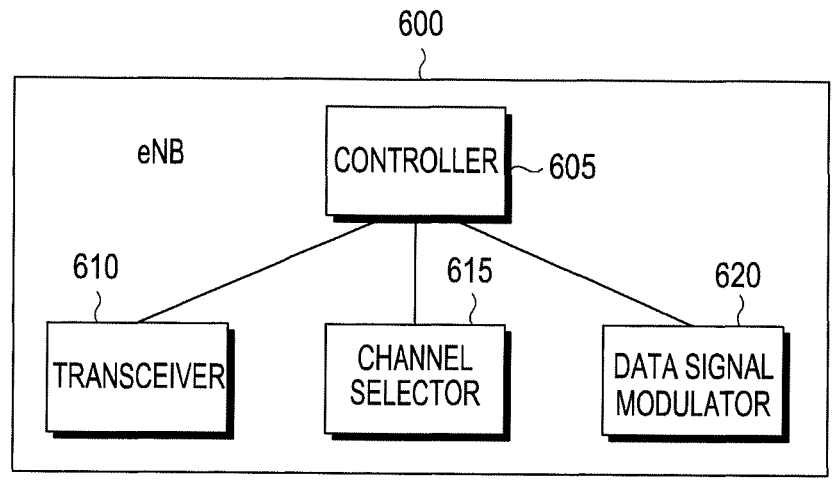
FIG. 6 is an exemplary block diagram of an eNB according to an embodiment of the present disclosure.

FIG. 6 is an exemplary block diagram of an eNB according to an embodiment of the present disclosure.

Referring to FIG. 6, an eNB 600 includes, for example, a controller 605, a transceiver 610, a channel selector 615, and a signal modulator 620. The components of the eNB 600 are configured on an operation basis for the convenience of description. Accordingly, one component can be divided into sub-units or a plurality of components can be incorporated into a single unit depending on an operator's intent or according to embodiments.

The controller 605 provides overall control to the operations of the eNB described before with reference to FIG. 4. The transceiver 610, the channel selection 615, and the signal modulator 620 operate under the control of the controller 605. The transceiver 610 receives spatial correlation information about channels that a UE has estimated or channel estimation information according to embodiments. The channel estimation information has been described before and thus will not be described redundantly herein. The channel selector 615 operates to generate a partial channel selection matrix and an expansion matrix according to operation 405 of FIG. 4, and the signal modulator 620 generates a modulated data signal to be transmitted to the UE by performing precoder expansion for total channels, channel coding, and symbol mapping based on the channel estimation information received through the transceiver 610. Subsequently, the transceiver 610 transmits the modulated data signal to the UE using allocated transmission resources under the control of the controller 605.

Figure 7:
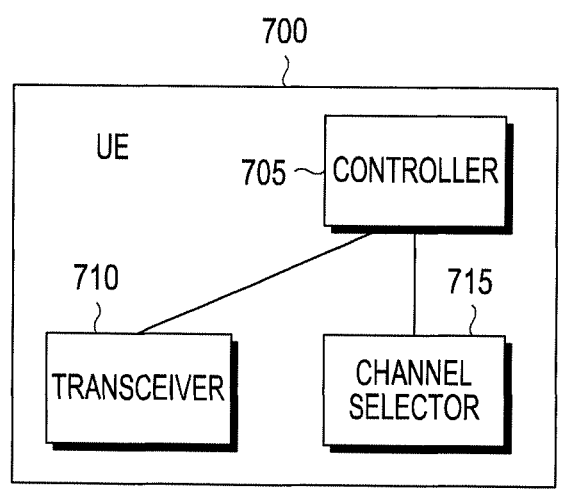
FIG. 7 is an exemplary block diagram of a UE according to an embodiment of the present disclosure.

FIG. 7 is an exemplary block diagram of a UE according to an embodiment of the present disclosure.

Referring to FIG. 7, a UE 700 includes, for example, a controller 705, a transceiver 710, and a channel estimator 715. Like the components of the eNB, one component can be divided into sub-units or a plurality of components can be incorporated into a single unit in the UE 700 depending on an operator's intent or according to embodiments.

The controller 705 provides overall control to the operations of the UE 700 described before with reference to FIG. 5. The transceiver 710 receives pilots on partial channels selected by the eNB and a signal (an expansion matrix) for channel estimation on a control channel. The partial channels and the expansion matrix have been described before and thus will not be described redundantly herein.

The channel estimator 715 generates channel estimation information according to operation 505 of FIG. 5, and the transceiver 710 receives from the eNB a data signal loaded on an expansion precoder that the eNB has expanded using a partial precoder based on the channel estimation information received from the UE.

As is apparent from the foregoing description of the present disclosure, since a part of large-capacity channels established by a plurality of antennas are estimated and the total channels are estimated based on the estimation result, the operation complexity and resource consumption of legacy channel estimation can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for channel feedback at a base station (BS) in a wireless communication system, the method comprising:
selecting at least one channel satisfying a predetermined condition among a plurality of channels based on spatial correlations of the plurality of channels between the BS and a user equipment (UE); estimating remaining channels among the plurality of channels based on the selected at least one channel;
obtaining a matrix for the plurality of channels using the estimated remaining channels and the selected at least one channel;
transmitting a pilot signal and information for the matrix on the selected at least one channel;
receiving, from the UE, an index of a first precoder for the at least one channel and a channel quality indicator;
obtaining a second precoder for the plurality of channels based on the first precoder and the matrix; and
transmitting, to the UE, a data signal corresponding to the channel quality indicator on the plurality of channels using the second precoder.

2. The method of claim 1, wherein the spatial correlations of the plurality of channels are estimated based on an uplink signal received from the UE.

3. The method of claim 1, wherein the spatial correlations of the plurality of channels are received from the UE.

4. The method of claim 1, wherein the first precoder is selected to maximize the channel quality indicator estimated for a case in which the BS uses the second precoder.

5. The method of claim 1, wherein the data signal is modulated according to a modulation scheme and a code rate corresponding to the channel quality indicator.

6. A method for transmitting channel feedback at a user equipment (UE) in a wireless communication system, the method comprising:
receiving, from a base station (BS), a pilot signal and matrix information for a plurality of channels on at least one channel satisfying a predetermined condition, wherein the at least one channel is selected from the plurality of channels based on spatial correlations of the plurality of channels between the BS and the UE;
estimating channel information of the at least one channel based on the pilot signal, and obtaining a first precoder for the at least one channel using the channel information and the matrix information;
transmitting, to the BS, an index of the first precoder and a channel quality indicator; and
receiving, from the BS, a data signal corresponding to the channel quality indicator on the plurality of channels using a second precoder for the plurality of channels,
wherein the second precoder is obtained based on the first precoder and the matrix information, and
wherein a matrix indicated by the matrix information is obtained using the at least one channel and remaining channels estimated from the plurality of channels based on the at least one channel.

7. The method of claim 6, further comprising:
estimating the spatial correlations for the plurality of channels, and transmitting, to the BS, a result of the estimated spatial correlations.

8. The method of claim 6, wherein the first precoder is selected to maximize the channel quality indicator estimated for a case in which the BS uses the second precoder.

9. The method of claim 8, wherein the data signal is modulated according to a modulation scheme and a code rate corresponding to the channel quality indicator.

10. A base station (BS) for channel feedback in a wireless communication system, the BS comprising:
a controller configured to select at least one channel satisfying a predetermined condition among a plurality of channels based on spatial correlations of the plurality of channels between the BS and a user equipment (UE), and estimate remaining channels among the plurality of channels based on the selected at least one channel, obtaining a matrix for the plurality of channels using the estimated remaining channels and the selected at least one channel; and
a transceiver configured to transmit a pilot signal and information for the matrix on the selected at least one channel, and receive, from the UE, an index of a first precoder for the at least one channel and a channel quality indicator,
wherein a second precoder for the plurality of channels is obtained based on the first precoder and the matrix, and the controller is configured to control the transceiver to transmit, to the UE, a data signal corresponding to the channel quality indicator on the plurality of channels using the second precoder,
wherein the first precoder is selected using the matrix and channel information of the at least one channel estimated based on the pilot signal.

11. The BS of claim 10, wherein the spatial correlations of the plurality of channels are estimated based on an uplink signal received from the UE.

12. The BS of claim 10, wherein the spatial correlations of the plurality of channels are received from the UE.

13. The BS of claim 10, wherein the first precoder is selected to maximize the channel quality indicator estimated for a case in which a BS uses the second precoder.

14. The BS of claim 10, wherein the data signal is modulated according to a modulation scheme and a code rate corresponding to the channel quality indicator.

15. A user equipment (UE) for transmitting channel feedback in a wireless communication system, the UE comprising:
a transceiver configured to receive, from a base station (BS), a pilot signal and matrix information for a plurality of channels on at least one channel satisfying a predetermined condition, wherein the at least one channel is selected from the plurality of channels based on spatial correlations of the plurality of channels between the BS and the UE; and
a controller configured to estimate channel information of the at least one channel based on the pilot signal, and obtaining a first precoder for at least one channel using the channel information and the matrix information, and control the transceiver to transmit, to the BS, an index of the first precoder and a channel quality indicator, and to receive, from the BS, a data signal corresponding to the channel quality indicator on the plurality of channels using a second precoder for the plurality of channels,
wherein the second precoder is obtained based on the first precoder and the matrix information, and
wherein a matrix indicated by the matrix information is obtained using the at least one channel and remaining channels estimated from the plurality of channels based on the at least one channel.

16. The UE of claim 15, wherein the controller is configured to estimate the spatial correlations for the plurality of channels, and transmit, to the BS, a result of the estimated spatial correlations.

17. The UE of claim 15, wherein the first precoder is selected to maximize the channel quality indicator estimated for a case in which the BS uses the second precoder.

18. The UE of claim 15, wherein the data signal is modulated according to a modulation scheme and code rate corresponding to the channel quality indicator.

* * * * *